US012667744B2

(12) United States Patent
Kliem

(10) Patent No.: US 12,667,744 B2
(45) Date of Patent: Jun. 30, 2026

(54) INERTING INTERMITTENT SUPPRESSION SYSTEM

(71) Applicant: KIDDE-FENWAL, LLC, Ashland, MA (US)

(72) Inventor: John Kliem, Wayland, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 505 days.

(21) Appl. No.: 18/087,080

(22) Filed: Dec. 22, 2022

(65) Prior Publication Data

US 2023/0211198 A1 Jul. 6, 2023

Related U.S. Application Data

(60) Provisional application No. 63/296,337, filed on Jan. 4, 2022.

(51) Int. Cl.
*A62C 37/44* (2006.01)
*A62C 3/00* (2006.01)

(52) U.S. Cl.
CPC ................ *A62C 37/44* (2013.01); *A62C 3/00* (2013.01)

(58) Field of Classification Search
CPC ........... A62C 3/00; A62C 37/44; A62C 31/00; A62C 35/00; A62C 3/0207; A62C 3/14; A62C 99/0018; F24F 11/32–35
See application file for complete search history.

(56) References Cited

U.S. PATENT DOCUMENTS

| | | | | |
|---|---|---|---|---|
| 3,757,866 | A | 9/1973 | Mears et al. | |
| 7,658,232 | B2 * | 2/2010 | Anderson | A62C 35/02 169/37 |
| 10,265,561 | B2 * | 4/2019 | Meis | A62C 37/44 |
| 2010/0263885 | A1 * | 10/2010 | Tuma | H05K 7/20781 169/46 |
| 2012/0031634 | A1 | 2/2012 | Lewinski et al. | |
| 2015/0136430 | A1 * | 5/2015 | Livchak | F24C 15/2021 169/61 |
| 2020/0129796 | A1 * | 4/2020 | Bogart | A62C 99/0018 |

FOREIGN PATENT DOCUMENTS

| | | | | |
|---|---|---|---|---|
| DE | 2532163 | A1 | 2/1977 | |
| WO | WO-2020245725 | A1 * | 12/2020 | A62C 37/40 |

OTHER PUBLICATIONS

Extended European Search Report for European Application No. 22216231.5; Report Mail Date May 3, 2023 (6 pages).

* cited by examiner

*Primary Examiner* — Christopher R Dandridge
(74) *Attorney, Agent, or Firm* — Honigman LLP; Andrew J. Boes

(57) ABSTRACT

A method of operating a suppression system includes opening a discharge valve associated with a pressurized vessel containing suppression agent in response to detection of a hazardous condition within an area being monitored, releasing suppression agent into the area being monitored via a discharge nozzle, and detecting that the hazardous condition is no longer present in the area being monitored. The discharge valve is closed by the actuator in response to detecting that the hazardous condition is no longer present in the area being monitored.

11 Claims, 3 Drawing Sheets

INERTING INTERMITTENT SUPPRESSION SYSTEM

CROSS-REFERENCE TO RELATED APPLICATIONS

This application claims the benefit of U.S. Provisional Application No. 63/296,337 filed Jan. 4, 2022, the disclosure of which is incorporated herein by reference in its entirety.

BACKGROUND

Exemplary embodiments relate generally to suppression systems and, more particularly, to a system and method for controlling the supply of suppression agent expelled to a desired area.

Existing suppression systems are operable to rapidly discharge a suppression agent upon detection of a hazard event or manual activation. For example, all of the suppression agent of the system is discharged in less than two minutes. Accordingly, after operation of the suppression system, the suppression system has to be reset by replacing or refilling the containers of pressurized suppression agent and blocking the flow through the pipe system via one or more valves. Such systems are not suitable applications that require multiple extinguishing events, or the ability to hold the suppression capability due to losses, or process changes like venting or cooling.

BRIEF DESCRIPTION

According to an embodiment, a suppression system includes opening a discharge valve associated with a pressurized vessel containing suppression agent in response to detection of a hazardous condition within an area being monitored, releasing suppression agent into the area being monitored via a discharge nozzle, and detecting that the hazardous condition is no longer present in the area being monitored. The discharge valve is closed by the actuator in response to detecting that the hazardous condition is no longer present in the area being monitored.

In addition to one or more of the features described herein, or as an alternative, further embodiments closing the discharge valve further comprises stopping a flow of suppression agent to the discharge nozzle.

In addition to one or more of the features described herein, or as an alternative, further embodiments closing the discharge valve results in an intermittent release of suppression agent into the area being monitored.

In addition to one or more of the features described herein, or as an alternative, further embodiments the pressurized vessel contains suppression agent during the closing the discharge valve.

In addition to one or more of the features described herein, or as an alternative, further embodiments comprising reopening the discharge valve in response to the detection of the hazardous condition.

In addition to one or more of the features described herein, or as an alternative, further embodiments the detection of the hazardous condition further comprises monitoring, via a detection device, a parameter of the area being monitored and determining when the parameter exceeds an allowable threshold.

In addition to one or more of the features described herein, or as an alternative, further embodiments closing the discharge valve occurs in response to detecting that the parameter is below the allowable threshold.

In addition to one or more of the features described herein, or as an alternative, further embodiments the detection of the hazardous condition further comprises monitoring, via a sensor, an operational status of another system associated with the area being monitored and determining when the another system is in a predefined operating condition.

In addition to one or more of the features described herein, or as an alternative, further embodiments closing the discharge valve further comprises determining when the another system is not in the predefined operating condition.

In addition to one or more of the features described herein, or as an alternative, further embodiments comprising controlling a flow rate of suppression agent provided to the discharge nozzle via the discharge valve.

In addition to one or more of the features described herein, or as an alternative, further embodiments the discharge valve is a pressure regulating valve.

According to an embodiment, a suppression system for an area being monitored includes a source of suppression agent having an outlet, a discharge nozzle, a delivery piping system fluidly connecting the source of suppression agent and the discharge nozzle, and a discharge valve operably coupled to the outlet of the source of suppression agent. The discharge valve is movable between a closed position and an open position. An actuator is operably coupled to the discharge valve. The actuator is operable to transform the discharge valve from the open position to the closed position to stop a flow of suppression agent to the discharge nozzle. The actuator is configured to transform the discharge valve to the open position when a hazardous condition is detected, and to transform the discharge valve to the closed position when the hazardous condition is no longer detected in the area being monitored.

In addition to one or more of the features described herein, or as an alternative, further embodiments the discharge valve is a pressure regulating valve.

In addition to one or more of the features described herein, or as an alternative, further embodiments the discharge valve is integrated into the outlet of the source of suppression agent.

In addition to one or more of the features described herein, or as an alternative, further embodiments the discharge valve is arranged downstream from the outlet of the source of suppression agent, within the delivery piping system.

In addition to one or more of the features described herein, or as an alternative, further embodiments comprising a detection device for monitoring a parameter of the area being monitored and a controller operably coupled to the detection device and to the actuator. The controller is configured to adjust the discharge valve in response to the parameter monitored by the detection device.

In addition to one or more of the features described herein, or as an alternative, further embodiments comprising a sensor for monitoring a parameter of another system associated with the area being monitored and a controller operably coupled to the sensor and to the actuator. The controller is configured to adjust the discharge valve in response to the parameter of the another system monitored by the sensor.

In addition to one or more of the features described herein, or as an alternative, further embodiments the area being monitored includes at least one lithium ion battery and the another system includes a ventilation system operable to exhaust off-gasses of the at least one lithium ion battery.

In addition to one or more of the features described herein, or as an alternative, further embodiments the ventilation system includes at least one of a fan and a vent and the sensor is operable to monitor an operational status of at least one of the fan and the vent.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
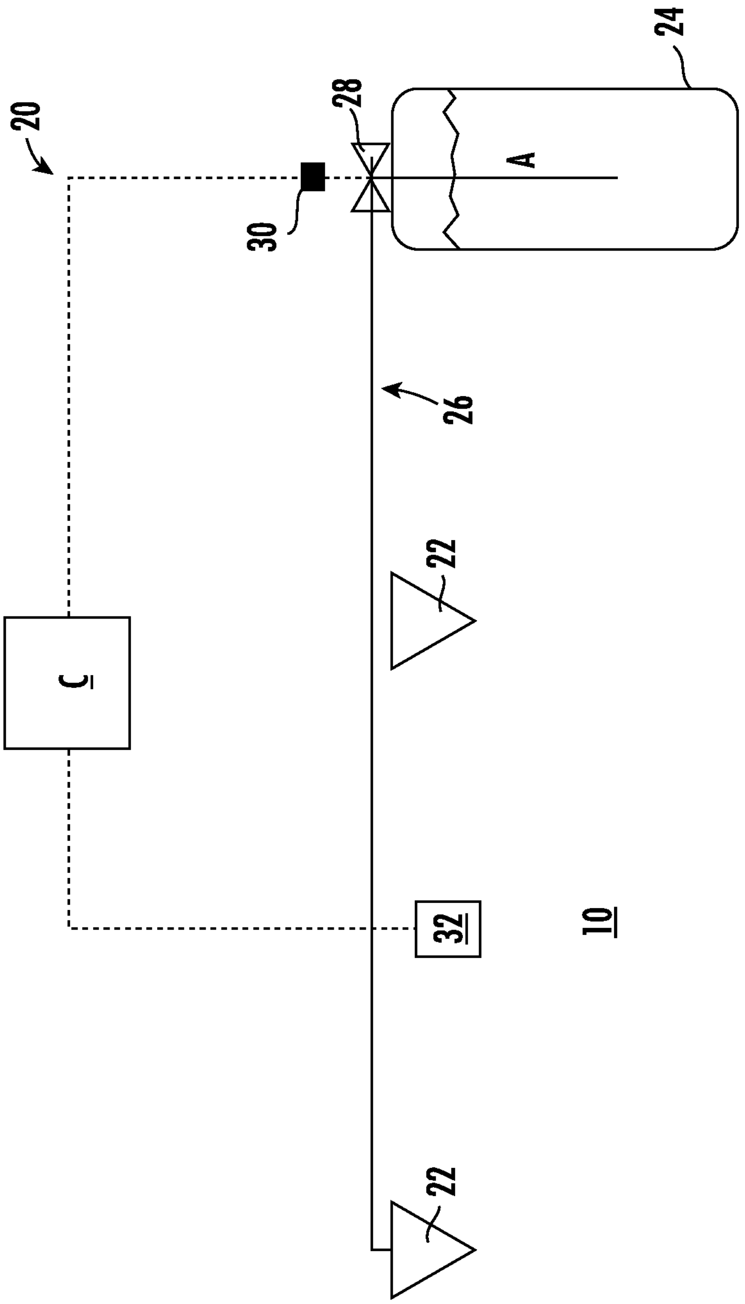
FIG. 1 is a schematic diagram of an exemplary suppression system according to an embodiment.

With reference now to FIG. 1, an exemplary system 20 for delivering a suppression agent to a space 10 where smoke, a fire, or another hazard has been detected is illustrated. The suppression system 20 may be located separate or remotely from the one or more areas being monitored 10, or alternatively, may be integrated or housed at least partially within the one or more areas being monitored 10. It should be understood that the configuration of the suppression system 20 may vary based on the overall structural design of area being monitored 10 and/or the configuration of the building within which the at least one area being monitored 10 is located.

Figure 2:
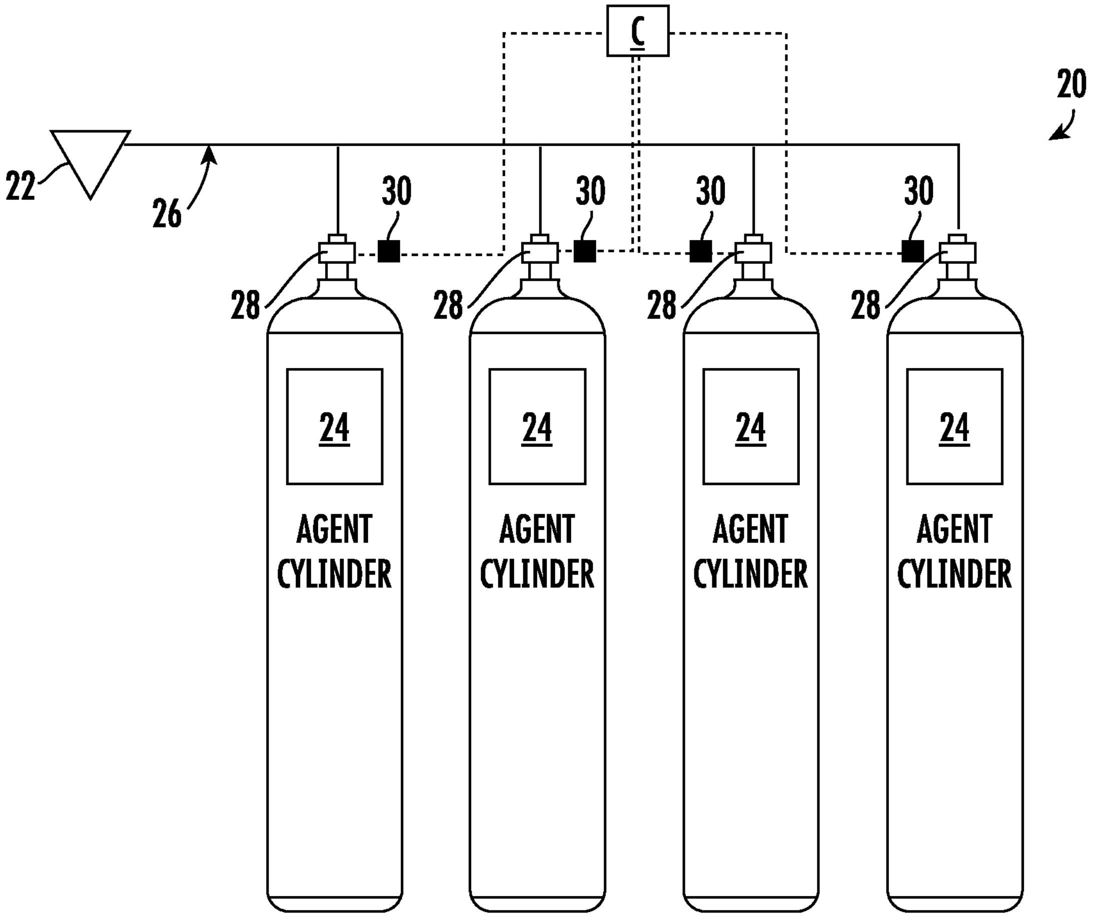
FIG. 2 is a schematic diagram of another exemplary suppression system according to an embodiment.

As shown in FIG. 1, the suppression system 20 includes at least one discharge nozzle 22 associated with the at least one area being monitored 10 and at least one source of suppression agent A in the form of a self-contained pressurized vessel 24. In embodiments including a plurality of areas being monitored 10, one or more discharge nozzles 22 may be dedicated to each area being monitored 10, or alternatively, one or more discharge nozzles 22 may be associated with multiple areas of the areas being monitored 10. Although only a single pressurized vessel 24 is illustrated in FIG. 1, in other embodiments, as shown in FIG. 2, the suppression system 20 may include a plurality of pressurized vessels 24 arranged into one or more groups. In embodiments where the pressurized vessels 24 are arranged into multiple groups, each group may, but need not be associated with a respective portion of the area being monitored, or a respective area being monitored. The one or more pressurized vessels of suppression agent A are arranged in fluid communication with the discharge nozzles 22 via an agent delivery path defined by a delivery piping system 26. In response to detection of a hazardous event (or upon manual activation of the suppression system 20, in certain instances), the suppression agent A is allowed to flow through the delivery piping system 26 to the one or more discharge nozzles 22 for release directly into the area being monitored 10.

Those skilled in the art will readily appreciate that the suppression agent described herein can be any suitable agent, including but not limited to, water, dry chemical agent, wet chemical agent, or the like. In an embodiment, the suppression agent is a "clean" agent, which is an electrically non-conducting, volatile, or gaseous fire extinguishant that does not leave a residue upon evaporation, such as FM-200™ (HFC-227ea) and 3M™ Novec™ 1230 (FK-5-112), or inert gases, such as nitrogen, argon, carbon dioxide, or some combination thereof.

Further, one or more of the pressurized vessels 24 of suppression agent A may additionally contain a gas propellant for facilitating the movement of the suppression agent A through the delivery piping system 26. However, embodiments where the gas propellant is alternatively or additionally stored separately from the suppression agent A are also contemplated herein.

A discharge valve 28 is arranged adjacent to an outlet of the pressurized vessel 24. The discharge valve 28 may be integrally formed with the pressurized vessel 24, such as at the outlet thereof, or alternatively, may be arranged within the delivery piping system 26 at a location downstream from the pressurized vessel 24. In an embodiment, the discharge valve 28 is a pressure regulating valve operable to control the volume or flow rate of the suppression agent A as it is released from the pressurized vessel 24 into the delivery piping system 26. In embodiments of the suppression system 20 including a plurality of pressurized vessels 24, a discharge valve 28 may be operably coupled to a respective pressurized vessel 24, or to a plurality of pressurized vessels 24.

The discharge valves used in existing fire suppression systems are typically only transformable from a closed position to an open position. Accordingly, once such a discharge valve is opened, it is not possible to stop the release of suppression agent from the system. Unlike the prior discharge valves, in an embodiment, the at least one discharge valve 28 of the suppression system 20 is not only transformable from a closed position to an open position, but is also transformable from the open position to the closed position. Inclusion of such a discharge valve 28 allows the suppression agent A to be expelled or released from the pressurized vessel 24 either continuously, or intermittently, such as in controlled amounts or spurts. As a result, suppression agent A may be released into the area being monitored 10 for only a limited period of time and the discharge valve 28 may be returned to the closed position to stop further release of the suppression agent A while some suppression agent A remains within the pressurized vessel 24.

An actuator 30, such as a solenoid, for example, is operably coupled to the at least one discharge valve 28. In embodiments of the suppression system 20 including a plurality of pressurized vessels 24, the suppression system 20 may include one or more actuators 30. Accordingly, each actuator 30 may be operably coupled to the discharge valve 28 of a respective pressurized vessel 24 or may be operably coupled to the discharge valves 28 of a plurality of pressurized vessels 24, such as an entire group of pressurized vessels 24 for example. In such embodiments, the actuator 30 may be configured to operate each of the plurality of discharge valves 28 simultaneously. In another embodiment, the actuator 30 is configured to operate the discharge valves 28 in series. When the discharge valve 28 associated with a pressurized vessel 24 is opened by the actuator 30, the suppression agent A is able to flow from the pressurized vessel 24 through the delivery piping system 26 to one or more of the discharge nozzles 22

A control device C, such as a microprocessor based controller, for example, is operably coupled to the one or more actuators 30 of the suppression system 20. In an embodiment, the control device C is a control panel. The control device C is configured to communicate a signal to the one or more actuators 30 to transform at least one discharge valve 28 associated with the actuator 30 between an open position and a closed position.

In an embodiment, the suppression system 20 includes at least one detection device (illustrated schematically at 32), such as a conventional fire detector, fire sensor, heat sensor, gas sensor, or other sensor for example. The detection device 32 may be directly connected to the control device C, such as with a wire for example, or may be configured to communicate with the control device C wirelessly. The detection device may be configured to monitor one or more parameters within the area being monitored 10 to detect the presence of a hazardous condition. In response to a signal from one or more of the detection devices 32 indicating that a monitored parameter, such as heat or smoke for example, within the area being monitored 10 exceeds an allowable threshold, the control device C may be configured to communicate with an actuator 30 associated with one or more discharge valves 28. In an embodiment, in response to a signal indicating that the monitored parameter exceeds the threshold, the control device C instructs that actuator 30 to open one or more discharge valves 28. The detection device 32 may be configured to continue to monitor the parameter while the suppression agent A is expelled into the area being monitored 10. In an embodiment, when parameter being monitored falls below the threshold, thereby representing that the hazardous condition is no longer present, the control device C may be configured to instruct the actuator 30 to close the one or more discharge valves 28. Accordingly, only the amount of suppression agent needed to address a sensed event is release from the suppression system 20.

In an embodiment, the suppression system 20 includes one or more sensors S (shown in FIG. 3) operable to monitor one or more parameters of another system associated with the area being monitored 10. The sensors S described herein may be in addition to or as an alternative to the detection devices 32 previously described. However, operation of the suppression system 20 in response to the one or more parameters being monitored by the sensor S is similar to operation in response to a parameter monitored by a detection device 32. When the control device C receives a signal from a sensor S indicating that a predetermined operating condition of the other system is met, the control device C instructs that actuator 30 to open one or more discharge valves 28 and release suppression agent A into the area being monitored. The discharge valves 28 will remain open until the control device C receives a signal indicating that the other system is no longer in the predefined operating condition, the control device C is configured to instruct the instruct the actuator 30 to close the one or more discharge valves 28.

Figure 3:
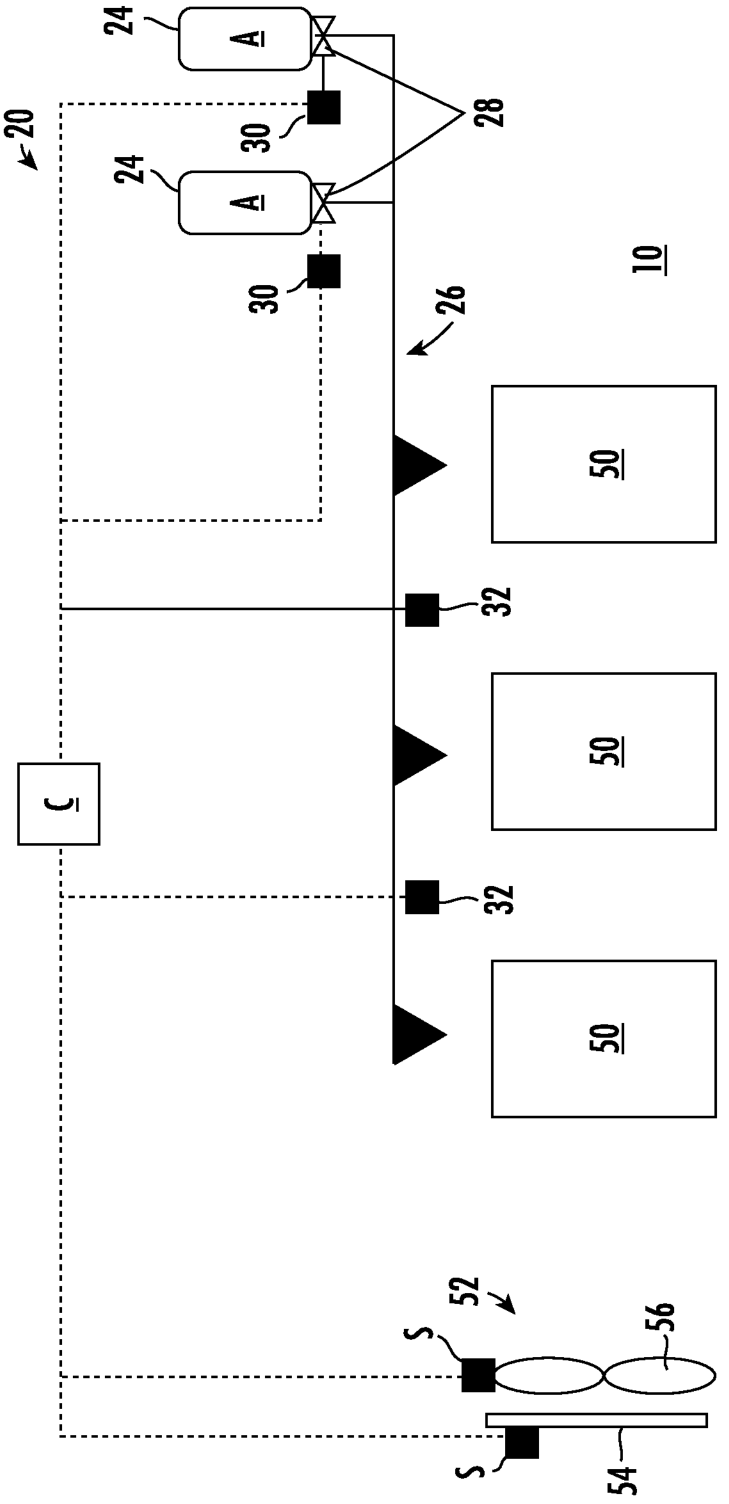
FIG. 3 is a schematic diagram of another exemplary suppression system for an area of a battery energy storage system according to an embodiment.

For example, with reference to FIG. 3, in an embodiment, the area being monitored 10 by the suppression system 20 contains at least one lithium ion battery 50. Further, a ventilation system 52 including a vent 54 and/or fan 56 may be operably coupled to the area being monitored 10. The vent 54 may be configured to open in response to detection of the presence of off-gasses within the area surrounding the batteries 50. The fan 56 may be energized in response to detection of the presence of off-gasses within the area surrounding the batteries. Accordingly, a sensor S of the suppression system 20 may be operable to monitor an operational status of the ventilation system 52, such as by monitoring a position or movement of the vent 54 and/or the fan 56.

A sensor S will communicate to the control device C that an operational status of one of the vent 54 or fan 56 has changed, which indicates the presence of off-gasses within the area around the batteries, or that the off-gasses within the area around the batteries exceeds an acceptable threshold. Accordingly, to inert the flammable or explosive off-gasses, the control device C will activate the suppression system 20 and release suppression agent A, such as inert gas, into the area surrounding the batteries 50. In an embodiment, the suppression system 20 remains active or operational (at least one discharge valve 28 remains open) until the off-gasses within the area dissipate or return to an acceptable level. With the off-gasses at an acceptable level, the fan 56 may be turned off and/or the vent 54 may be closed. Such a change may be detected by the one or more sensors S and communicated to the control device C. In response to such a signal, the control device C communicates with the actuator 30 to close the one or more discharges valves 28 that are associated with a flow of suppression agent A to the area being monitored 10. As time passes, the discharge valve 28 may be repeatedly reopened and reclosed to selectively release a desired amount of suppression agent A.

A suppression system 20 having one or more discharge valves 28 that transformable from an open position to a closed position would provide enhanced suppression capabilities by allowing for both continuous and intermittent releases of suppression agent. The suppression system 20 would allow for extended discharges of suppression agent A and would allow for a secondary release of suppression agent A as a supplement to a primary release of suppression agent A. Accordingly, because the release of suppression agent A from the suppression system 20 may be stopped, the suppression system 20 may have an increased life or hold time.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A suppression system for an area being monitored, the area including a combustible component and a ventilation system, the ventilation system including a vent and a fan, wherein the vent is operable to open and close and opens in response to a detection of a presence of a predetermined gas and the fan is actuated in response to the detection of the presence of the predetermined gas, the system comprising:

a source of suppression agent having an outlet;

a discharge nozzle;

a delivery piping system fluidly connecting the source of suppression agent and the discharge nozzle;

a discharge valve operably coupled to the outlet of the source of suppression agent, the discharge valve being movable between a closed position and an open position;

an actuator operably coupled to the discharge valve, the actuator being operable to transform the discharge valve from the open position to the closed position to stop a flow of suppression agent to the discharge nozzle;

a first sensor configured to detect one of a position or movement of the vent and an operational state of the fan; and a controller configured to process the detection of the first sensor, wherein the controller is configured to actuate the actuator to place the discharge valve in the open position when the fan is actuated energized and the vent is open or opening, and actuate the actuator to place the discharge valve in the closed position when the fan is not energized and the vent is closed or closing.

2. The suppression system of claim 1, wherein the discharge valve is a pressure regulating valve.

3. The suppression system of claim 1, wherein the discharge valve is integrated into the outlet of the source of suppression agent.

4. The suppression system of claim 1, wherein the discharge valve is arranged downstream from the outlet of the source of suppression agent, within the delivery piping system.

5. The suppression system of claim 1, further comprising:

a detection device for monitoring a parameter of the area being monitored; and the controller is operably coupled to the detection device and to the actuator, wherein the controller is further configured to adjust the discharge valve in response to the parameter monitored by the detection device.

6. The suppression system of claim 1, wherein the controller is further configured to adjust the discharge valve in response to the position of the vent between the open and closed position.

7. The suppression system of claim 6, wherein the combustible component includes at least one lithium ion battery and the ventilation system is operable to exhaust off-gasses of the at least one lithium ion battery.

8. A method of operating a suppression system for an area being monitored, the area including a combustible component and a ventilation system, the ventilation system including a vent, a fan, a source of suppression agent having an outlet, a discharge nozzle, a delivery piping system fluidly connecting the source of suppression agent and the discharge nozzle, and a discharge valve operably coupled to the outlet of the source of suppression agent, the discharge valve being movable between a closed position and an open position, wherein the vent is operable to open and close and opens in response to a detection of a presence of a predetermined gas and the fan is actuated in response to the detection of the presence of the predetermined gas, the method comprising:

detecting one of a position or movement of the vent and an operational state of the fan;

opening, using an actuator, the discharge valve in response to the detection of the position and or movement of the vent and/or fan; and actuating the discharge valve to the open position when the vent is open or opening and/or the fan in operating as to release the fire suppression agent through the discharge nozzle, and actuate the discharge valve to the closed position when the vent is closed and/or the fan is not operating.

9. The method of claim 8, further including providing a sensor to detect the operational state of the fan and/or the position and/or movement of the vent.

10. The method of claim 8, further comprising controlling a flow rate of suppression agent provided to the discharge nozzle via the discharge valve.

11. The method of claim 8, wherein the discharge valve is a pressure regulating valve.

* * * * *